Aug. 25, 1931.  T. R. WILSON  1,820,205

CORNER PIECE FOR FRAME STRIPS

Filed June 10, 1929

Inventor
T.R.Wilson
By
Hiram A. Sturges
Attorney

Patented Aug. 25, 1931

1,820,205

UNITED STATES PATENT OFFICE

THEODORE R. WILSON, OF OMAHA, NEBRASKA, ASSIGNOR TO MICKLIN LUMBER COMPANY, OF OMAHA, NEBRASKA, A CORPORATION

CORNER PIECE FOR FRAME STRIPS

Application filed June 10, 1929. Serial No. 369,687.

This invention relates to a corner piece for frame strips, and more particularly for use in connecting the corners or joints of window screen frames and screen door frames.

The object of the invention, broadly, is to provide a socket which may be conveniently applied to the abutting ends of frame strips, will be effective in forming a rigid and strong connection for the joint, and to be of such construction that it may be manufactured at a limited expense.

One of the specific objects of the invention is to provide a corner piece for the purposes mentioned which will permit the strips to be planed, grooved or reduced in size so that the frame may fit suitably in a door, window or other opening.

The invention specifically includes a corner piece having a reinforced part or bridge extending inclinedly between its wings, which, together with certain supporting flanges provides a very strong construction.

The invention consists of the new and useful construction, combination and arrangement of parts as described herein and claimed and as illustrated in the accompanying drawings, it being understood that changes may be made in form, size, proportion and minor details as may be found to be of advantage, said changes being within the scope of the invention as claimed.

Figure 1:
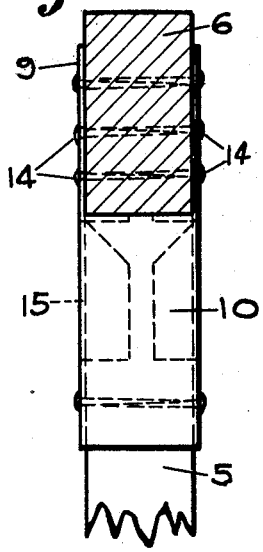
Figure 2:
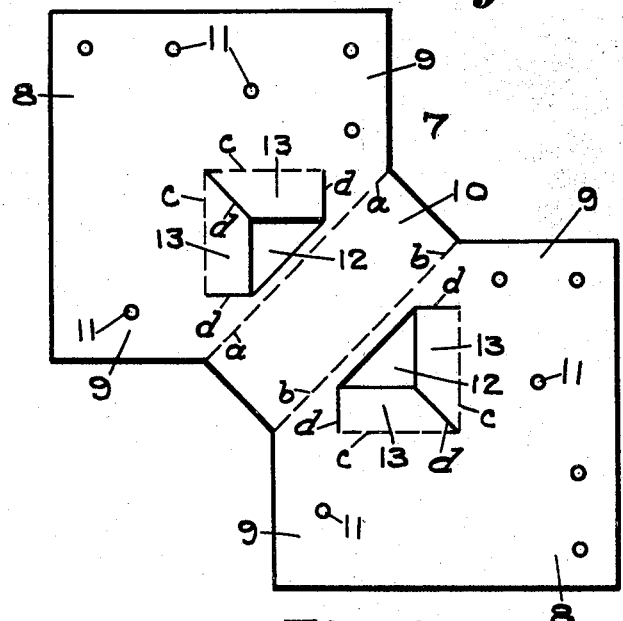
Figure 3:
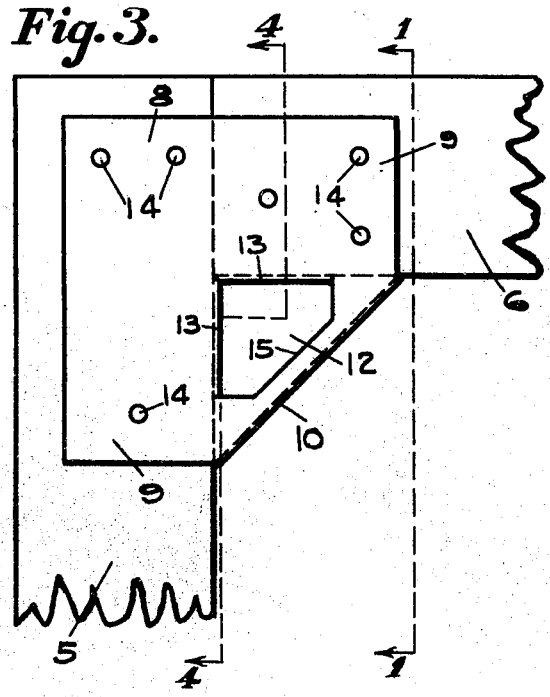
Figure 4:
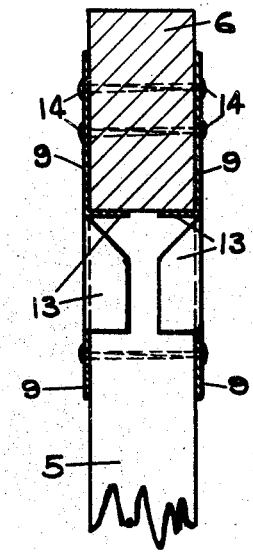

In the drawings, Fig. 1 is a transverse section through a frame strip on line 1—1 of Fig. 3 to clearly show a brace-member or bridge. Fig. 2 is a diagrammatic view showing a metallic incised sheet adapted to be bent to form the corner piece. Fig. 3 is a side view of the corner piece mounted upon two abutting frame strips. Fig. 4 is a sectional view on line 4—4 of Fig. 3.

Referring now to the drawings for a more particular description, the invention is shown and described in connection with a pair of frame strips 5 and 6, and in order that the objects may be attained as first mentioned, a metallic sheet 7, shown best in Fig. 2 of the drawings may be used, said sheet being incised to form the contour shown in said Fig. 2, and adapted to be bent at right-angles on the dotted parallel lines $a$—$a$ and $b$—$b$ to provide a pair of opposed approximately parallel wings 8 each having a pair of extensions 9, and providing a brace or bridge 10. Numerals 11 (Fig. 2) indicate holes for receiving keepers when the corner piece has been mounted on the strips 5 and 6.

As best shown in Fig. 2 of the drawings, the metallic sheet is provided, adjacent to the sides of the inclined bridge 10 with a pair of triangular apertures 12 and is bent on the dotted lines $c$—$c$ to provide a pair of flanges 13 at each aperture 12, short incisions $d$ being made in said sheet to permit the flanges 13 to be bent at right-angles to the sheet to form said flanges.

As thus described, the strips 5 and 6 may be placed between the opposed wings 8 and their extensions with their ends in engagement and it will be seen that the inner edge of each strip will engage an end of the bridge and will also engage a pair of flanges 13.

In operation, the strips 5 and 6 may be readily and conveniently placed in position as shown in Fig. 3 of the drawing since the device is open at its top and side, and after the strips are disposed in engagement with the ends of the bridge 10 and flanges 13 suitable keepers 14 are used for securing the wings and their extensions to said strips.

It will be seen that the bridge or brace 10 has a width equal to the thickness of the strips and since each of its ends are disposed in line with a pair of flanges 13 each strip will be adequately supported. Also the bridge at its longitudinal edges is provided with flanges 15 which materially adds to its strength.

Among the advantages not heretofore mentioned for the device it may be stated that it provides channels open at its top and side for receiving frame strips having a greater width than the width of the metallic wings to permit the edges of the frame strips to project outwardly of said wings, this feature being of great advantage since frames may need slight reduction in size in order to fit into openings.

While I have shown and described a corner piece made by incising and bending a metallic sheet and prefer this construction as a feature of economy in manufacture, I do not wish to limit myself in this respect and it is obvious that operation would be the same if produced as a metallic or other rigid casting.

I claim as my invention,—

A corner piece for frame members comprising a substantially rectangular bridge adapted to extend within the plane of the joint of the frame members and overlie the joint, wings connected to the bridge and extending in a plane at an angle to the plane of the bridge and adapted to engage the frame members, each wing having frame engaging portions struck therefrom and extending in a plane at an angle to the plane of the wing, that part of the wing between said frame engaging portions and the bridge forming an angularly disposed reinforcing flange integral with the bridge and arranged in a plane at an angle to the plane of the bridge, said reinforcing flange extending longitudinally of the bridge and oppositely disposed to said frame engaging portions, the flange being co-extensive with the wing to reinforce the bridge throughout its length.

In testimony whereof, I have affixed my signature.

THEODORE R. WILSON.